United States Patent [19]

Gerling

[11] Patent Number: 4,689,459
[45] Date of Patent: Aug. 25, 1987

[54] VARIABLE Q MICROWAVE APPLICATOR AND METHOD

[76] Inventor: John E. Gerling, 1628 Kansas Ave., Modesto, Calif. 95351

[21] Appl. No.: 774,058

[22] Filed: Sep. 9, 1985

[51] Int. Cl.⁴ ............................................. H05B 6/70
[52] U.S. Cl. ........................ 219/10.55 A; 219/10.55 F; 219/10.55 M; 333/22 R
[58] Field of Search ............... 219/10.55 A, 10.55 R, 219/10.55 F, 10.55 M, 10.55 E, 10.55 D; 333/22 R, 22 F, 17 R

[56] References Cited

U.S. PATENT DOCUMENTS

| 2,458,579 | 1/1949 | Feldman | 333/22 R X |
| 2,718,580 | 9/1955 | Shirley | 219/10.55 R |
| 3,622,732 | 11/1971 | Williams | 219/10.55 A |
| 3,673,370 | 6/1972 | Johnson | 219/10.55 A |
| 3,715,551 | 2/1973 | Peterson | 219/10.55 A |
| 3,784,777 | 1/1974 | Souligr | 219/10.55 A |
| 3,806,837 | 4/1974 | Carr et al. | 219/10.55 F X |
| 4,207,452 | 6/1980 | Arai | 219/10.55 A |
| 4,511,778 | 4/1985 | Takahashi et al. | 219/10.55 A |

Primary Examiner—Philip H. Leung
Attorney, Agent, or Firm—Flehr, Hohbach, Test, Albritton & Herbert

[57] ABSTRACT

Apparatus and method for applying microwave energy to a material in a resonant cavity. The Q of the cavity is reduced to broaden the bandwidth of the system by passing a portion of the microwave energy from the cavity through an iris plate to a dummy load positioned outside the cavity. Tuning stubs are provided to tune the cavity to resonance.

15 Claims, 4 Drawing Figures

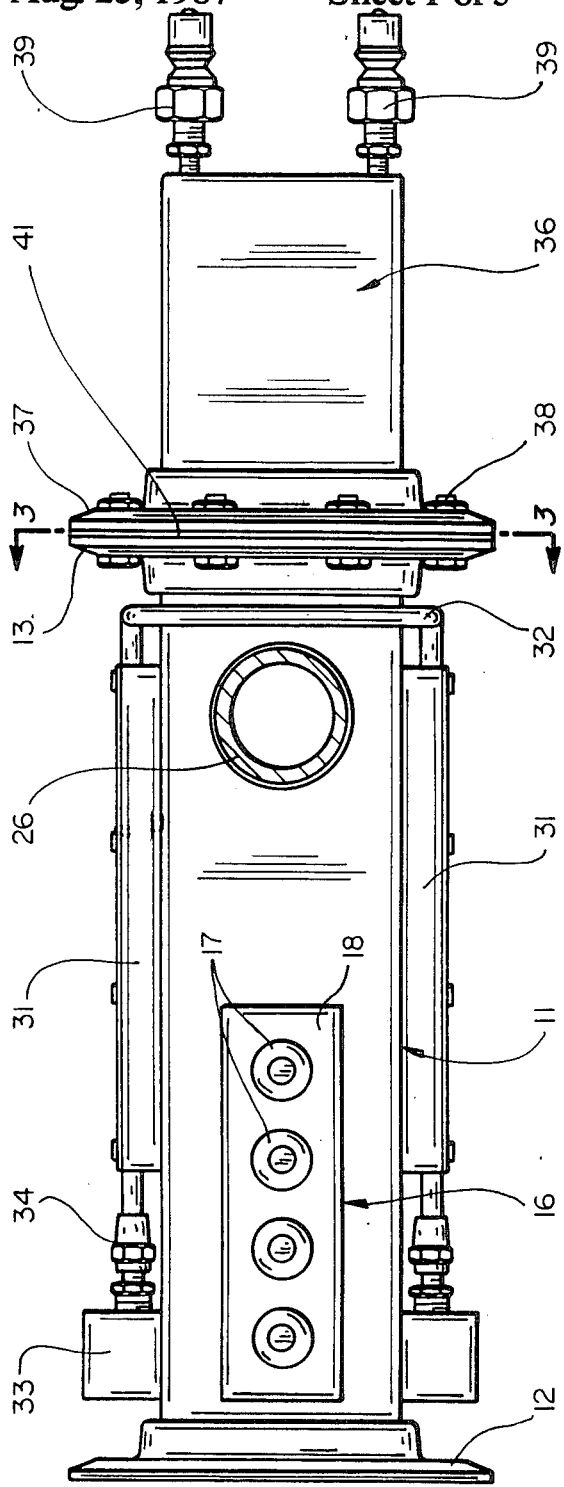

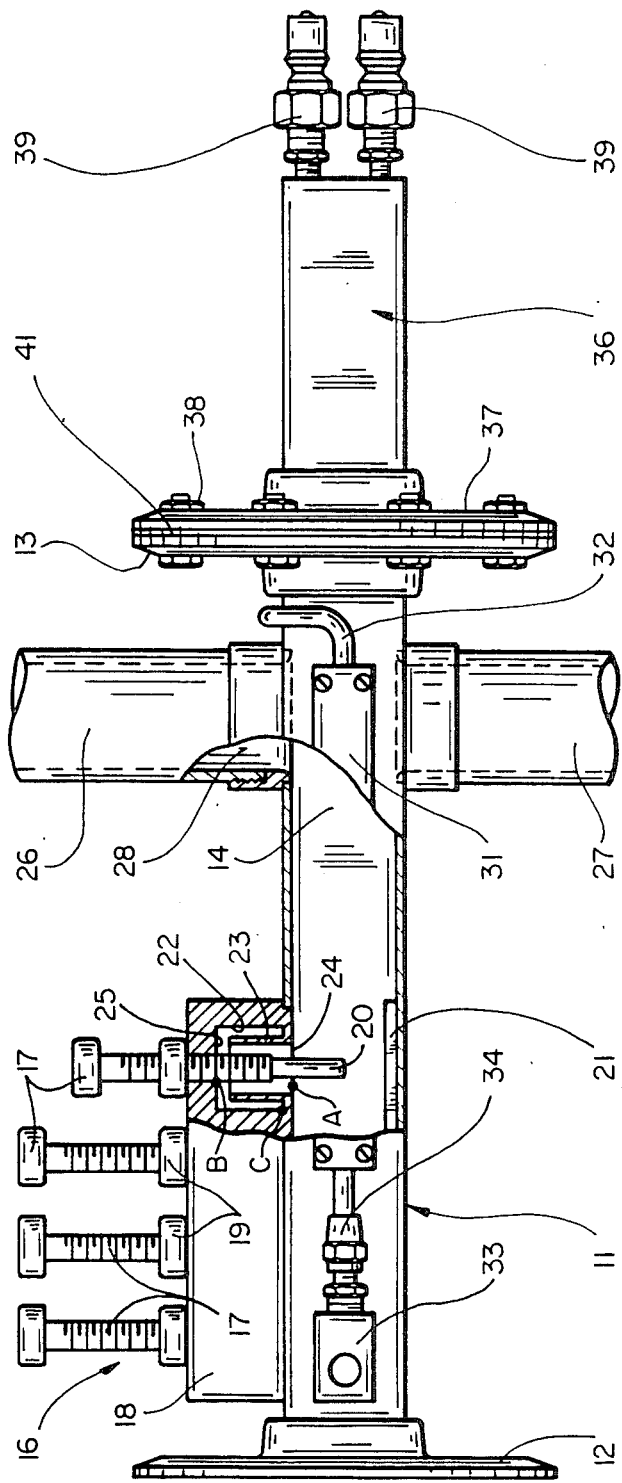
FIG_2

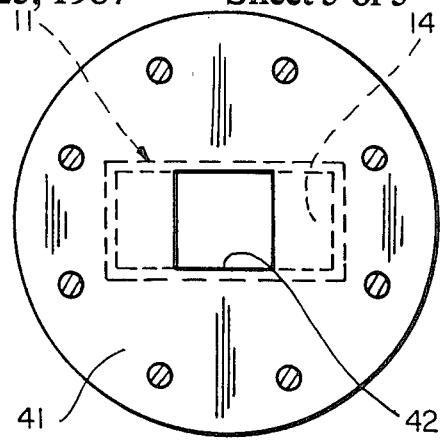
FIG_3
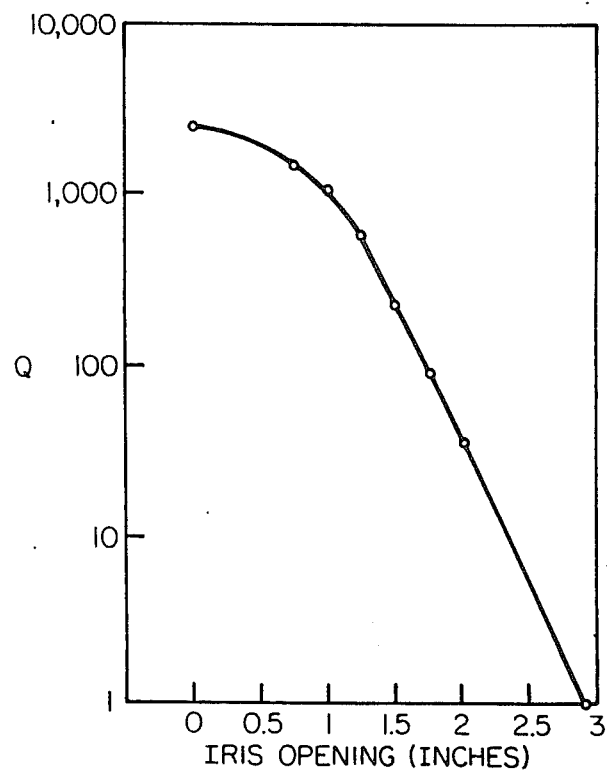
FIG_4

VARIABLE Q MICROWAVE APPLICATOR AND METHOD

This invention pertains generally to microwave heating, and more particularly to apparatus and a method for applying microwave energy to a material in a resonant cavity.

Applicators with single mode resonant cavities have heretofore been employed for heating a variety of materials with microwave energy. These materials include extruded products and certain food products which are passed through the cavities and heated on a continuous basis. U.S. Pat. No. 3,673,370 describes an applicator for drying a latex impregnated fiber which passes continuously through a cavity, and U.S. Pat. No. 4,207,452 describes an applicator for generating an activated gas plasma for use in the manufacture of semiconductor devices.

In one type of applicator currently employed for this purpose, the resonant cavity is formed by a section of waveguide which is closed or short-circuited at one end and connected to a microwave power source at the other end. The material to be treated is passed through the waveguide in a transverse direction along an axis parallel to the E-vector of the field and spaced one-quarter wavelength from the short circuited end of the waveguide. The system is tuned to resonance by means of a tuner positioned between the power source and the cavity. The material heated in a resonant cavity usually has very low microwave loss, and consequently it is necessary to expose the material to a relatively strong electric field (E-field) in order to produce appreciable heating of the material. The electric field strength can be increased either by increasing the power from the microwave generator or by making the applicator cavity resonant at the frequency of the microwave energy. A resonant cavity, when properly tuned and constructed to minimize natural cavity loss, will have an unloaded Q on the order of 1,500–2,000. With a low loss extruded product passing through the cavity, the Q is typically on the order of 1,000.

While a high Q is advantageous from the standpoint of increasing the electric field strength, high Q applicators have some disadvantages. The bandwidth of the cavity is inversely proportional to the Q, and with an unloaded Q of 1,200 and a center frequency of 2,450 MHz, the 3 db bandwidth of the cavity is only about 2 MHz. Microwave power sources generally do not generate power at a single stable frequency. A power source utilizing a magnetron has a broad power spectrum, and its center frequency can drift with factors such as temperature, the amplitude and phase of reflected power, and the age of the magnetron itself. The center frequency of the cavity is also subject to change. This center frequency is in part dependent upon the dielectric and loss characteristics of the material being treated, and changes in these parameters can change the tuning of the cavity. Also, the dimensions of the cavity may change with changes in temperature, and this can also cause the center frequency of the cavity to change. If the bandwidth of the power source and the applicator drift apart, some of the power generated will be reflected back to the source, and the power available to the load will be reduced. If the stored energy is too high, arcing can occur in the tuner section of the applicator, and this will prevent the material from being processed properly and can even result in a fire if the material is combustible.

In order to overcome these problems, there have been some attempts to reduce the Q and increase the bandwidth of the cavity by placing a lossy material in the cavity to absorb a portion of the microwave power. However, the lossy material has to be cooled, and it changes the tuning of the cavity and the location of the maximum E-field. Changing the Q from one value to another requires considerable retuning and readjustment, and precise control of the Q is difficult because the losses of the material are subject to change, particularly with temperature. In order to change the lossy material, it is generally necessary to dismantle the cavity and remove it from the system. This can be time consuming if the cavity is configured as an integral part of a product delivery system.

The tuner most commonly employed in microwave applicators has a threaded body mounted on one wall of the waveguide which forms the resonant cavity, with an adjustable tuning stub threadedly mounted in the body and extending into the waveguide. A locking nut is mounted on the tuning stub and tightened against the threaded body to jam the threads of the stub and the body together to improve electrical contact between them. When microwave energy is introduced into the waveguide, current flows along the wall of the waveguide, through the threads and into the tuning stub. As the Q of the resonant cavity and the field strength are increased, the current passing through the threads are into the stub also increases. The heat produced by this current can cause the threaded body and/or the tuning stub to expand, jamming the threads and making the stub too hot to tune while the applicator is in operation.

It is in general an object of the invention to provide a new and improved apparatus and method for applying microwave energy to a material.

Another abject of the invention is to provide apparatus and a method of the above character in which the Q of a resonant cavity can be reduced without the problems encountered with the prior art.

Another object of the invention is to provide apparatus and a method of the above character in which the Q is readily varied.

Another object of the invention is to provide apparatus and a method of the above character is which excessive heating and jamming of the tuning stubs employed for tuning the cavity is avoided.

These and other objects are achieved in accordance with the invention by providing a microwave applicator having a resonant cavity, means for introducing microwave energy into the cavity, a dummy load positioned outside the cavity, and an iris plate positioned between the cavity and the dummy load with an opening which permits a predetermined amount of energy to pass from the cavity to the dummy load where it is absorbed without reflection to lower the Q of the cavity. The iris plate is readily removed and replaced with plates having different size openings to vary the Q of the cavity. The tuning stubs which tune the cavity to resonance are mounted in a manner which avoids excessive heating and jamming of the stubs during operation of the applicator.

FIG. 1 is a top plan view of one embodiment of a microwave applicator according to the invention.

FIG. 2 is a side elevational view partly borken away, of the embodiment of FIG. 1.

FIG. 3 is a cross-sectional view taken along line 3—3 in FIG. 1.

FIG. 4 is a graphical representation of the relationship between the Q of the cavity and the size of the iris plate opening in the embodiment of FIG. 1.

As illustrated in FIGS. 1 and 2, the applicator has an axially elongated housing 11 of generally rectangular cross-section. This housing is fabricated from a section of rectangular waveguide with radially extending circular flanges 12, 13 at the ends thereof. A microwave power source (not shown) is connected to flange 12 for introducing microwave energy into the housing, and a cavity 14 is formed toward the other end of the housing.

A tuner 16 is mounted on the upper wall of the housing between flange 12 and cavity 14 for tuning the cavity to resonance. The tuner comprises a plurality of adjustable tuning stubs 17 which are threadedly mounted in a block 18 and locked in position by jam nuts 19. The inner ends or tips 20 of the tuning stubs extend into the housing by an amount which can be adjusted to tune the cavity ot resonance. The tuning stubs, block and jam nuts are all fabricated of an electrically conductive material, and the jam nuts help to assure good electrical contact between the stubs and the block. The tip portions of the stubs are plated with a highly conductive material such as silver, and a piece of dielectric material 21 is mounted on the inside of the bottom wall of the housing opposite the tuning stubs to prevent arcing between the stubs and the housing wall.

Tuning stub tip 20 is positioned coaxially within a circular bore 22 in block 18, and a cylindrical flange 23 is positioned coaxially between the stub and the wall of the bore. An annular wall 24 interconnects the lower portions of flange 23 and block 18, and a gap is provided between the upper end of the flange and the end wall 25 of the bore. The dimensions of the bore and the cylindrical flange are such that the distance between points A and B and the distance between points B and C are each equal to one-forth of a wavelength at the frequency of the microwave energy introduced into the applicator. Point A is located on a circle positioned midway between the confronting surfaces of stup tip 20 and flange 23 in the plane of the lower surface of block 18, point B is located at the intersection of the tuning stub and the end wall of bore 22, and point C is located at the junction of end wall 24 and the side wall of the bore.

Energy from the waveguide enters the opening between the tip portion 20 of the tuning stub and flange 23, passes up around the upper end of the flange and down to annular wall 24 where it is short-circuited and reflected. The short-circuit is a point of voltage minimum and current maximum, and since the distance between points B and C is a quarter wavelength, the reflected energy at point B is at a voltage maximum and a current minimum. Because of the current minimum, only a very small amount of current flows through the threads into the stub. Since the distance between points A and B is also a quarter wavelength, point A is a point of minimum voltage and maximum current, and current can pass from the wall of the waveguide to the stub at this point without excessive heating of the stub.

An entry tube 26 and an exit tube 27 extend in a transverse direction from opposite sides of the housing toward the end in which cavity 14 is formed. These tubes are aligned with each other and define a path through the cavity along which the material to be treated can pass. The size of the tubes is such that there is no microwave leakage through the tubes when a product of given size and dielectric properties is passing through them.

Cooling jackets 31 are mounted on the side walls of the housing and interconnected by a cross-over line 32. A circulating coolant is delivered to and removed from the cooling jackets through connecting blocks 33 and fittings 34.

A dummy load 36 is mounted outside cavity 14 at the end of the housing opposite the power source and in axial alignment with the housing. The dummy load absorbs microwave energy without reflection, and it is removably mounted on housing flange 13 by means of a mounting flange 37 and bolts 38. A circulating coolant is supplied through fittings 39 to cool to the dummy load.

An iris plate 41 is mounted between flanges 13 and 37 and spaced fromt he centerline of the passageway formed by the entry and exit tubes by a distance equal to one-forth of the wavelength of the microwave energy in the cavity. The plate has a central opening 42 which is aligned with the axis of the housing. The size of the opening determines the amount of microwave energy which passes from the cavity to the dummy load and, hence, the Q of the cavity. As the size of the opening in the iris plate is increased, the amount of power absorbed by the dummy load is also increased, thereby reducing the Q of the cavity and the amount of power absorbed therein. Reducing the Q reduces the tendency to arc and increases the operation bandwidth of the applicator, making interaction between the applicator and the power source easier to manage. The relationship between the unloaded cavity Q and the width of the iris opening for a cavity fabricated of WR 284 waveguide at an operating frequency of 2,450 MHz is illustrated if FIG. 4. This waveguide has a width of approximately 3 inches and height of approximately 1.5 inches.

Since the power absorbed by the dummy load is lost, there is some trade-off between system efficiency and bandwidth.

However, a loss of efficiency can be compensated for more economically than can come of the operational problems associated with applicators having high Q's. It has been found that a reasonable balance between system efficiency and stable long term performance is provided when the Q of the applicator is limited to a maximum value on the order of 200–400.

The invention has a number of important features and advantages. Since the iris plate is removably mounted and positioned outside the waveguide housing, it can be removed and replaced without disturbing the remainder of the apparatus. The Q of the applicator can be varied simply by installing plates with different size openings which permit more or less energy to be absorbed by the dummy load. The combination of the reduced Q and the tuning stub structure avoids overheating and jamming of the the tuning stubs during operation of the applicator.

It is apparent from the foregoing that a new and improved microwave applicator and method have been provided. While only certian persently preferred embodiments have been described in detail, as will be apparent to those skilled in the art, certain changes and modifications can be made without departing from the scope of the invention as defined by the following claims.

I claim:

1. In apparatus for applying microwave energy to a material: a resonant cavity, means for introducing microwave energy into the cavity, a dummy load positioned outside the cavity, and an iris plate positioned between the cavity and the dummy load and having an opening which permits a predetermined amount of energy to pass from the cavity to the dummy load where it is absorbed without reflection to lower the Q of the cavity.

2. The apparatus of claim 1 wherein the iris plate and the dummy load are mounted on one side of the cavity and can be removed and replaced without disturbing the remainder of the apparatus.

3. The apparatus of claim 1 wherein the microwave energy is introduced into the cavity from one end thereof, the iris plate is positioned at the other end of the cavity, and the dummy load is positioned outside the cavity adjacent to the iris plate.

4. The apparatus of claim 3 including entry and exit ports which communicate with the cavity and define a path along which a material to be processed travels as it passes through the cavity.

5. The apparatus of claim 4 wherein the iris plate is spaced from the path by a distance on the order of one-forth of the wavelength of the microwave energy.

6. The apparatus of claim 1 including adjustable tuning stubs for adjusting the resonant frequency of the cavity.

7. The apparatus of claim 4 wherein the iris plate is interchangeable with other iris plates with openings of different sizes which permit different amounts of energy to pass to the dummy load to vary the Q of the cavity.

8. In a method for applying energy to a material in a resonant cavity, the steps of: introducing microwave energy into the cavity, positioning a dummy load which absorbs microwave energy outside the cavity, and passing a portion of the microwave energy from the cavity through an iris opening to the dummy load to reduce the Q of the cavity, the amount of microwave energy passing through the opening being determined by the size of the opening.

9. The method of claim 8 wherein the microwave energy is introduced into the cavity in an axial direction, and the material to which the energy is applied is passed through the cavity in a direction generally perpendicular to the axial direction.

10. In apparatus for applying microwave energy to a material: an axially extending housing defining a cavity toward one end thereof, means for introducing microwave energy into the cavity from the other end of the housing, means for tunign the cavity to resonance at the frequency of the microwave energy, entry and exit tubes extending transversely from the housing on opposite sides of the cavity for passing the material into and out of the cavity, an iris plate mounted on the housing at the end adjacent to the cavity with an opening through which a predetermined amount of the microwave energy can pass from the cavity, and a dummy load positioned outside the cavity for absorbing the microwave energy passing through the plate to reduce the Q of the cavity.

11. The apparatus of claim 10 wherein the means for tuning the cavity includes a pluarality of adjustable tuning stubs threadedly mounted on the wall of the housing at a point where current produced by the microwave energy is at a minimum.

12. The apparatus of claim 10 wherein the iris plate is removably mounted on the housing and is interchangeable with other iris plates having openings of different sizes which permit different amounts of microwave energy to pass from the cavity to the dummy load.

13. The apparatus of claim 10 wherein the housing and the dummy load have radially extending flanges secured together in facing relation, and the iris plate is mounted between the flanges.

14. The apparatus of claim 10 wherein the iris plate is spaced from the centerline of the entry and exit ports by a distance on the order of one-quarter of the wavelength of the microwave energy in the cavity.

15. The apparatus of claim 10 wherein the opening in the iris plate is of a size which reduces the Q of the cavity to a level no greater than about 200–400.

* * * * *